June 12, 1962     L. C. HUTHMACHER     3,038,583
MATERIAL LOADING MACHINE
Filed June 30, 1961     3 Sheets-Sheet 1
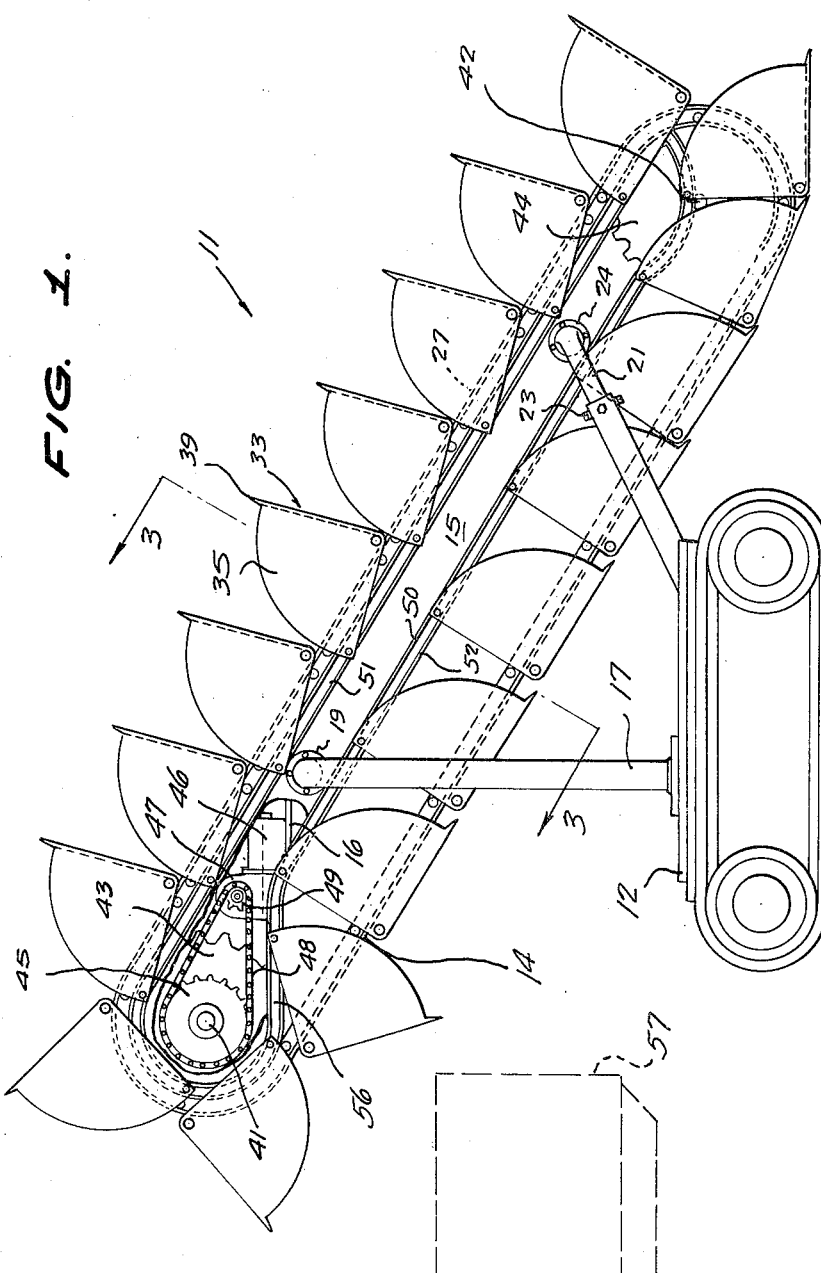
INVENTOR.
LESTER C. HUTHMACHER,
BY
McMorrow, Berman & Davidson
ATTORNEYS.

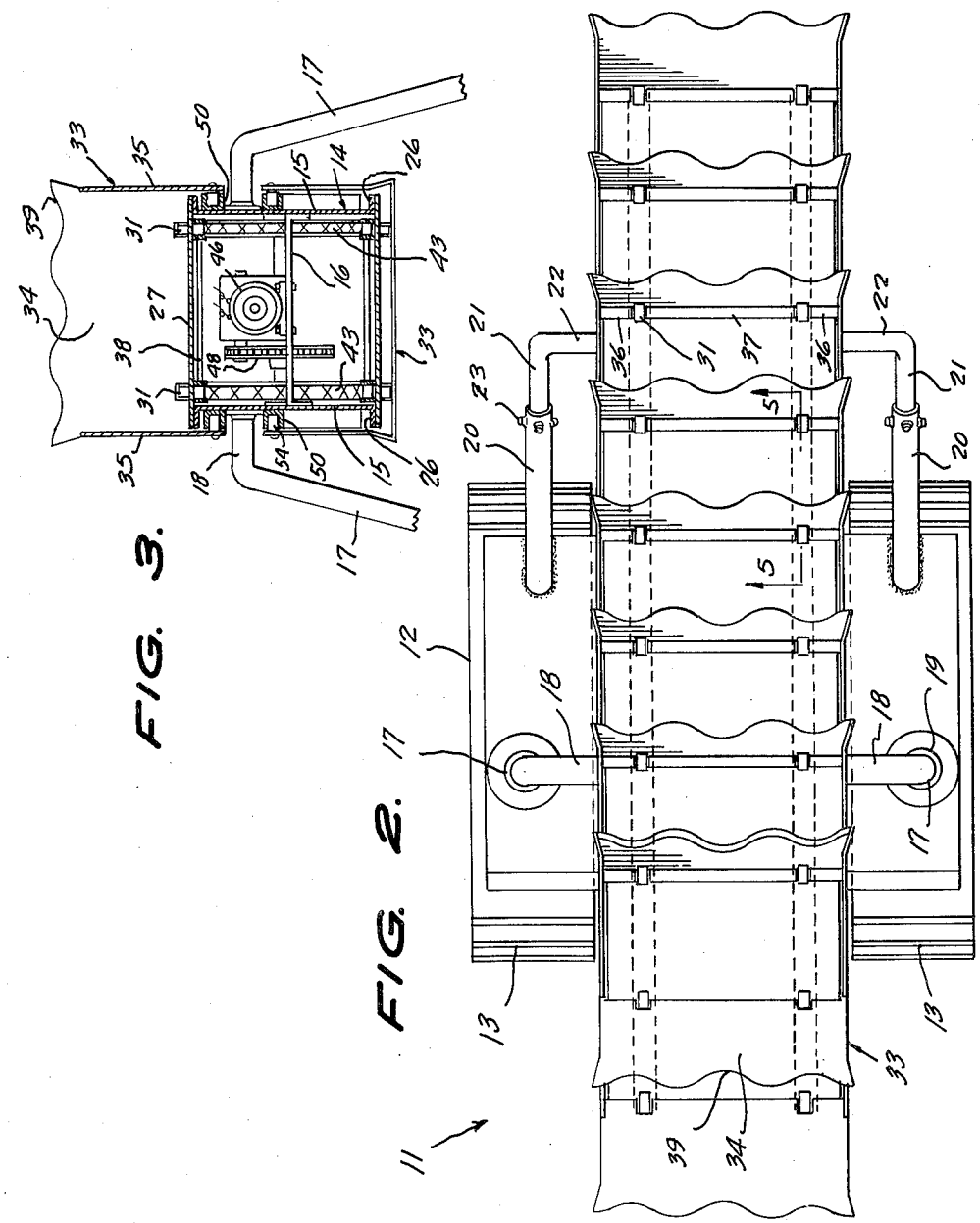

June 12, 1962 L. C. HUTHMACHER 3,038,583
MATERIAL LOADING MACHINE
Filed June 30, 1961 3 Sheets-Sheet 3
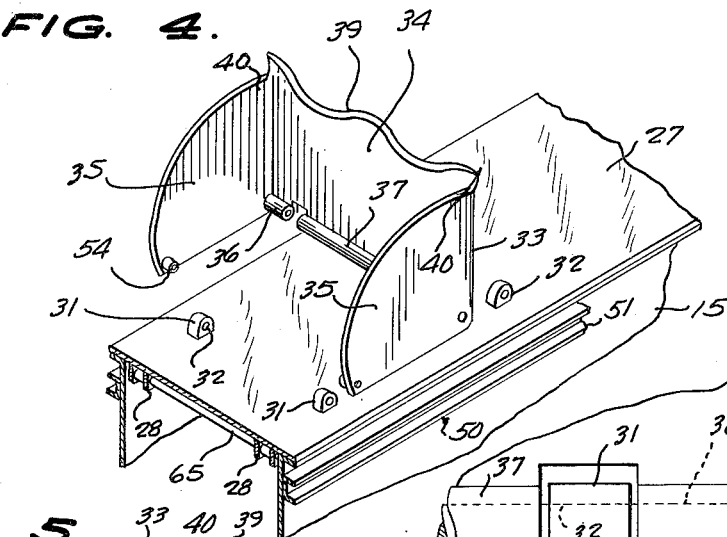
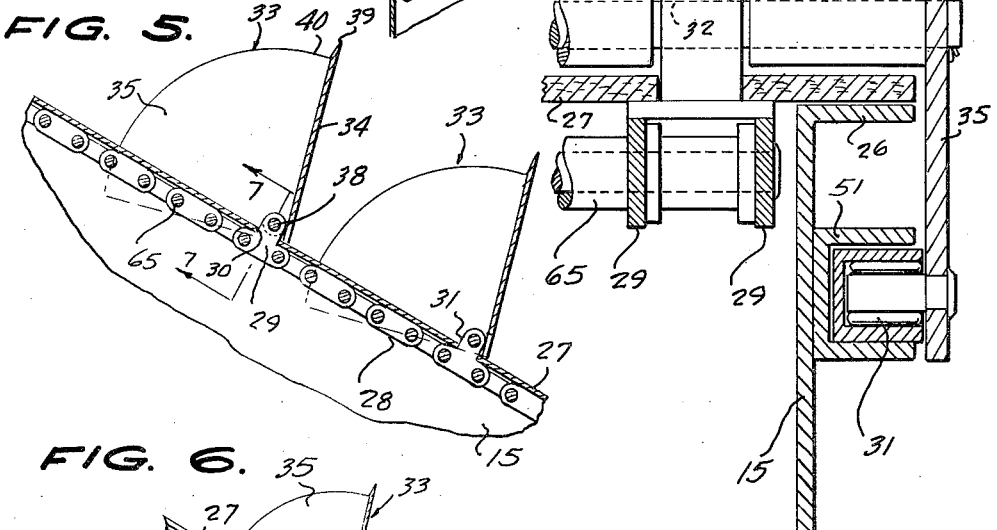
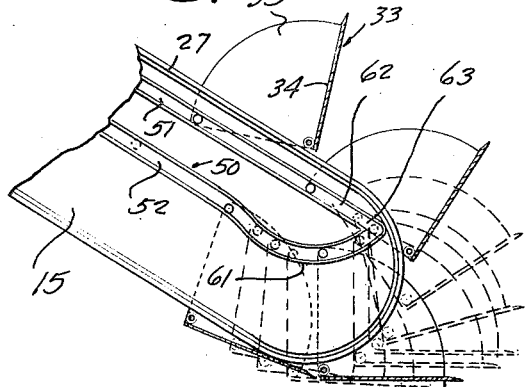
INVENTOR.
LESTER C. HUTHMACHER,
BY
McMorrow, Berman + Davidson
ATTORNEYS.

United States Patent Office 3,038,583
Patented June 12, 1962

3,038,583
MATERIAL LOADING MACHINE
Lester C. Huthmacher, P.O. Box 726, Wenden, Ariz.
Filed June 30, 1961, Ser. No. 120,986
6 Claims. (Cl. 198—7)

This invention relates to material handling devices, and more particularly to a material loading machine of the type known as a "mucking" machine.

A main object of the invention is to provide a novel and improved continuously operating material loading machine which is relatively simple in construction, which is readily transportable to any desired location where it is to be used, and which provides an economical and efficient means for rapidly transferring loose material to a vehicle or to an intended receptacle which is elevated with respect to the material.

A further object of the invention is to provide an improved material loading machine which is relatively inexpensive to fabricate, which is durable in construction, which is reliable in operation, and which requires a minimum amount of maintenance and human supervision.

A still further object of the invention is to provide an improved material loading machine of the swinging bucket type, the machine being provided with means for automatically rotating the bucket elements thereof to proper positions for receiving the material to be loaded and for conveying the material to a vehicle or to an elevated receptacle, after which the buckets are automatically retracted and prepared for movement to the location of the material.

Further objects and advantages of the invention will become apparent from the following description and claims, and from the accompanying drawings, wherein:

FIGURE 1 is a side elevational view of an improved material loading machine constructed in accordance with the present invention.

FIGURE 2 is a top plan view of the machine shown in FIGURE 1.

FIGURE 3 is a cross sectional view taken substantially on the line 3—3 of FIGURE 1.

FIGURE 4 is a fragmentary perspective view of a top portion of the machine of FIGURES 1 and 2, the machine being shown with a bucket element thereof separated from its hinge lugs.

FIGURE 5 is a vertical cross sectional view taken substantially on the line 5—5 of FIGURE 2.

FIGURE 6 is a fragmentary vertical cross sectional view taken longitudinally through the lower portion of the material loading machine of FIGURES 1 and 2 and illustrating the manner in which the bucket elements of the machine are extended as they move around the lower portion of the machine.

FIGURE 7 is an enlarged cross sectional view taken substantially on the line 7—7 of FIGURE 5.

Referring to the drawings, 11 generally designates an improved material loading machine constructed in accordance with the present invention. The machine 11 comprises a suitable support 12 which may be in the form of a vehicle of the tractor or caterpillar tread type, being illustrated as being provided with caterpillar treads 13, 13. The vehicle is provided with suitable drive means for actuating the caterpillar treads 13, 13, enabling the vehicle to be moved to its intended working location.

Designated generally at 14 is an inclined conveyor frame which is mounted on the support 12, the frame 14 comprising a pair of longitudinally extending elongated vertical side plates 15, 15 which are rigidly connected together in parallel spaced relationship, for example, by transversely extending horizontal connecting plates 16. A pair of upstanding supporting posts 17, 17 extend upwardly from the opposite side portions of the main frame of the supporting vehicle 12, the side posts 17 having horizontally inwardly extending top arms 18 which are respectively rigidly secured to the upper portions of the side plates 15, 15, as shown at 19. Rigidly secured to the frame of the supporting vehicle 12 at one end portion thereof are a pair of upwardly and forwardly inclined tubular supporting members 20, 20 which telescopically receive the arms 21, 21 of a pair of additional supporting members 22, 22 rigidly secured to the lower portions of the respective side plates 15, 15. The arms 21, 21 are secured in the tubular elements 20, 20 in adjusted positions therein by means of set screws 23 provided on the tubular supporting members 20. The connections at 19 are preferably angularly adjustable so that the angle of inclination of the frame 14 may be varied, as required, the set screws 23 being tightened after the frame has been adjusted to the desired angle of inclination. It will be understood that the connections of the members 22 to the side plates 15, shown at 24, are likewise sufficiently adjustable to enable the aforesaid angular adjustment of the conveyor frame 14 to be accomplished.

The parallel frame plates 15, 15 are provided with outwardly projecting peripheral flanges 26, 26, and supported on the flanges 26, 26 is an endless flexible conveyor belt 27 of any suitable durable flexible sheet material.

Respective endless sprocket chains 28, 28 are disposed inside the opposite marginal portions of the flexible endless conveyor belt 27, being located inwardly adjacent the marginal portions of the side plates 15, 15. The sprocket chains 28 include spaced link members 29 of inverted T-shape whose stem portions project upwardly through apertures 30 formed in the respective side marginal portions of the belt 27, the upwardly projecting ends 31 of the elements 29 being formed with apertures 32. Respective bucket members 33 are hingedly connected to the transversely aligned pairs of apertures 32, 32, the bucket members 33 each comprising a plate-like main portion 34 and parallel side walls 35, 35. The inner edges of the plate-like main portions 34 are provided with outer hinge sleeves 36 and an inner hinge sleeve 37, the sleeves 36 being spaced from the inner hinge sleeve 37 to receive the apertured lugs 31 therebetween, and the apertures 32 registering with the bores in the hinge sleeves 36 and 37 to receive a transverse hinge pin 38 which thus hingedly connects the associated bucket members 33 to the belt 27 for rotation on a transverse axis.

As shown in FIGURE 4, each plate-like main portion 34 is provided at its free outer edge with a sinuously curved beveled digging edge 39 which projects outwardly with respect to the adjacent edge portions 40, 40 of the associated side plates 35, 35.

Respective transverse sprocket shafts 41 and 42 are journaled in the opposite end portions of the parallel side plates 15, 15, the shafts 41 and 42 having secured thereon respective pairs of sprocket wheels 43 and 44 which meshingly engage with the sprocket chains 28, 28 and thus support the endless conveyor belt 27 on the frame 14. A driving sprocket wheel 45 is secured on the upper sprocket shaft 41 between the sprocket wheels 43, 43, and a driving motor 46 is mounted on an adjacent transverse plate 16, the motor being connected through a gear reduction unit 47 and a sprocket chain 48 to the driving sprocket wheel 45. As shown in FIGURE 1, the gear reduction unit 47 is provided with an output sprocket wheel 49 and the sprocket chain 48 couples the output sprocket wheel 49 to the driving sprocket 45 of the conveyor.

Secured on the outside surfaces of the respective side plates 15, 15 are respective endless outwardly facing channels 50, 50 which extend along the entire length of the frame and which comprise top portions 51 located relatively close to and parallel to the top run of the endless conveyor belt 27 and lower portions 52 which are spaced relatively large distances from the bottom run of the endless conveyor belt, as is clearly shown in FIGURE 1.

As shown in FIGURE 4, the side walls 35, 35 of the bucket members 33 are substantially quadrant-shaped, and have the arcuately curved outer edges 40, 40. At their free outer corners each side wall 35 is provided with an inwardly projecting follower roller 54 which is received in the adjacent portion of an endless guide channel 50. Thus the follower rollers 54 move in the guide channel 50 and control the positions of the bucket members 33 in accordance with the shape of the guide channels, as will be presently explained.

As shown in FIGURE 1, the guide channels on the opposite sides of the conveyor frame extend along the path of movement of the opposite side edges of the conveyor belt, and as previously mentioned, the upper portions of the guide channels are located substantially parallel to and relatively closely adjacent to the top end of the belt and the lower portions of the guide channel are spaced substantial distances from the lower run of the belt. At the top end of the conveyor frame the guide channels are arcuately curved, as shown in FIGURE 1, following the margins of the conveyor belt except for the inclined portions 56 which extend inwardly and away from the peripheral flanges 26 adjacent the upper end of the lower run of endless belt 27. Thus, the rollers 54 associated with the bucket members keep the bucket members extended, as shown in FIGURE 1, until they have rotated sufficiently to discharge the material contained therein and to begin return movement away from the region of the material-receiving vehicle or receptacle 57, shown in dotted view in FIGURE 1. The lower portions 52 of the guide channels 50 are spaced sufficiently from the bottom run of the belt to cause the plate-like main portions 34 of the bucket members to assume positions parallel and relatively close to the bottom run of the belt, as shown in FIGURE 1. The lower end loops of the guide channels 50, shown at 60, are shaped so that the plate-like main portions 34 of the bucket members will rotate in the manner illustrated in FIGURE 6 as the bucket members move around the lower end of the conveyor, the bottom loops 60 of the guide channels being relatively narrow and comprising arcuately curved bottom portions 61 which merge with the relatively straight top portions 62 of the channels at a relatively sharp angle 63, shown in FIGURE 6. The rollers 54 are thus guided so that the plate-like main portions 34 of the bucket members first assume horizontal positions as they move from the lower portion to the upper portion of the conveyor at the loading end thereof, the portions 34 gradually rotating from horizontal positions to upwardly extending positions until they reach positions wherein the rollers 54 engage in the straight top portions 62 of the guide channels, wherein the bucket members are positioned properly for retaining the material gathered by the bucket members for movement upwardly towards the top or discharge end of the conveyor.

It will be seen from FIGURE 6 that the guide channels 50 thus cooperate with the rollers 54 to automatically extend the digging and collecting main portions 34 of the bucket members so as to cause material to be loaded thereon, after which the members 34 are elevated relative to the conveyor belt so as to retain the material and to cause the material to be elevated with the movement of the belt towards the upper end of the conveyor, the material being then discharged from the bucket members into the receiving vehicle or receptacle 57. As previously mentioned, after the material has been discharged from the bucket members, the bucket members are automatically retracted to positions wherein the portions 34 thereof are supported in parallel closely spaced relation to the bottom run of the belt.

The drive chains 28 on the opposite sides of the conveyor are preferably provided with the common transversely extending link-connecting bars 65 which serve to connect the sprocket chains 28 so as to form a unitary assembly thereof.

As will be readily apparent, the loading device of the present invention can be made in any desired size and is especially useful in underground operations, such as in mining.

The driving motor 46 may be of any suitable type, for example, may be an electric motor, an air operated motor, a hydraulically operated motor, or a gasoline or diesel engine.

While a specific embodiment of an improved material loading machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A material loading machine comprising a support, an inclined conveyor frame on said support, an endless conveyor belt mounted on said frame, means driving said conveyor belt so that the top run of the belt moves upwardly on the frame, a plurality of bucket members hinged to the belt for rotation on transverse axes, said bucket members comprising plate-like main portions and side walls connected to the side edges of said main portions, an endless guide channel on the conveyor frame extending substantially for its entire length, and follower means on a side wall of each of the bucket members engaging in said guide channel, the upper portion of the guide channel being located sufficiently close to the top run of the belt to support the plate-like main portions of the bucket members on the top run in upwardly elevated positions relative to said top run, and the lower portion of the guide channel being sufficiently offset from the lower run of the belt to support the plate-like main portions of the bucket members on said lower run in positions relatively close to said lower run.

2. A material loading machine comprising a support, an inclined conveyor frame on said support, an endless conveyor belt mounted on said frame, means driving said conveyor belt so that the top run of the belt moves upwardly on the frame, a plurality of bucket members hinged to the belt for rotation on transverse axes, said bucket members comprising plate-like main portions and side walls connected to the side edges of said main portions, an outwardly facing endless guide channel mounted on a side of the conveyor frame and extending along the path of movement of the belt, the upper portion of the guide channel being located substantially parallel and relatively closely adjacent to the top run of the belt, and the lower portion of the guide channel being spaced a substantial distance from the lower run of the belt, and follower means on a side wall of each of the bucket members engaging in said guide channel, the upper portion of the guide channel being located sufficiently close to the top run of the belt to support the plate-like main portions of the bucket members on the top run in upwardly elevated positions relative to said top run and the lower portion of the guide channel being sufficiently offset from the lower run of the belt to support the plate-like main portions of the bucket members on said lower run in positions relatively close to said lower run.

3. A material loading machine comprising a support, an inclined conveyor frame on said support, an endless conveyor belt mounted on said frame, means driving said conveyor belt so that the top run of the belt moves upwardly on the frame, a plurality of bucket members hinged to the belt for rotation on transverse axes, said bucket members comprising plate-like main portions and side walls connected to the side edges of said main portions, an outwardly facing endless guide channel mounted on a side of the conveyor frame and extending along the path of movement of the belt, the upper portion of the guide channel being located substantially parallel to and relatively closely adjacent to the top run of the belt and the lower portion of the guide channel being spaced a substantial distance from the lower run of the belt, the connection between the lower portion and upper portion of the guide channel adjacent the lower end of the belt conveyor having a relatively small radius, to produce relatively rapid rotation of the plate-like main portions of the bucket members to outwardly extending positions as they move from the lower run to the upper run of the belt, the upper portion of the guide channel being located sufficiently close to the top run of the belt to support the plate-like main portions of the bucket members on the top run in upwardly elevated positions relative to said top run and the lower portion of the guide channel being sufficiently offset from the lower end of the belt to support the plate-like main portions of the bucket members on said lower run in positions relatively close to said lower run.

4. A material loading machine comprising a support, an inclined conveyor frame on said support, an endless conveyor belt mounted on said frame, means driving said conveyor belt so that the top run of the belt moves upwardly on the frame, a plurality of bucket members hinged to the belt for rotation on transverse axes, said bucket members comprising plate-like main portions and side walls connected to the side edges of said main portions, an outwardly facing endless guide channel mounted on a side of the conveyor frame and extending along the path of movement of the belt, the upper portion of the guide channel being located parallel to and relatively close adjacent to the top run of the belt and the lower portion of the guide channel being spaced a substantial distance from the lower run of the belt, the connection between the lower portion and upper portion of the guide channel adjacent the lower end of the belt conveyor having a relatively small radius, to produce relative rapid rotation of the plate-like main portions of the bucket members to outwardly extending positions as they move from the lower run to the upper run of the belt, the connection between the upper portion and the lower portion of the guide channel adjacent the upper end of the belt conveyor having a relatively large radius, whereby to support the plate-like main portions of the bucket members in outwardly projecting positions as they move from the upper run to the lower run of the belt, and follower means on a side wall of each of the bucket members engaging in said guide channel, the upper portion of the guide channel being located sufficiently close to the top end of the belt to support the plate-like main portions of the bucket member on the top run in upwardly elevated positions relative to said top run and the lower portion of the guide channel being sufficiently offset from the lower run of the belt to support the plate-like main portions of the bucket members on said lower run in positions relatively close to said lower run.

5. A material loading machine comprising a support, an inclined conveyor frame on said support, an endless conveyor belt mounted on said frame, means driving said conveyor belt so that the top run of the belt moves upwardly on the frame, a plurality of bucket members hinged to the belt for rotation on transverse axes, said bucket members comprising plate-like main portions and side walls connected to the side edges of said main portions, outwardly facing guide channels on the opposite sides of the conveyor frame extending along the path of movement of the opposite side edges of the conveyor belt, the upper portions of the guide channels being located substantially parallel to and relatively closely adjacent to the top run of the belt and the lower portions of the guide channels being spaced substantial distances from the lower run of the belt, and inwardly projecting follower members on the side walls of the bucket members engaging in said guide channels, the upper portions of the guide channels being located sufficiently close to the top run of the belt to support the plate-like main portions of the bucket members on the top run in upwardly elevated positions relative to said top run and the lower portions of the guide channels being sufficiently offset from the lower run of the belt to support the plate-like main portions of the bucket members on said lower run in positions relatively close to said lower run.

6. A material loading machine comprising a support, an inclined conveyor frame on said support, an endless conveyor belt mounted on said frame, means driving said conveyor belt so that the top run of the belt moves upwardly on the frame, a plurality of bucket members hinged to the belt for rotation on transverse axes, said bucket members comprising plate-like main portions and side walls connected to the side edges of said main portions, outwardly facing guide channels on the opposite sides of the conveyor frame extending along the path of movement of the opposite side edges of the conveyor belt, the upper portions of the guide channels being located substantially parallel to and relatively closely adjacent to the top run of the belt and the lower portions of the guide channels being spaced substantial distances from the lower run of the belt, and inwardly projecting follower members on the side walls of the bucket members engaging in said guide channels, the connection between the lower portions and upper portions of the guide channels adjacent the lower end of the belt conveyor having relatively small radii to produce relatively rapid rotation of the plate-like main portions of the bucket members to outwardly extending positions as they move from the lower run to the upper run of the belt, the connections between the upper portions and the lower portions of the guide channels adjacent the upper end of the belt conveyor having relatively large radii, whereby to support the plate-like main portions of the bucket members in outwardly projecting positions as they move from the upper run to the lower run of the belt, the upper portions of the guide channels being located sufficiently close to the top run of the belt to support the plate-like main portions of the bucket members on the top run in upwardly elevated positions relative to said top run and the lower portions of the guide channels being sufficiently offset from the lower run of the belt to support the plate-like main portions of the bucket members on said lower run in positions relatively close to said lower run.

No references cited.